United States Patent
Kim (10) Patent No.: US 9,384,897 B2
(45) Date of Patent: Jul. 5, 2016

(54) MULTILAYER CERAMIC CAPACITOR AND METHOD OF MANUFACTURING THE SAME

(71) Applicant: SAMSUNG ELECTRO-MECHANICS CO., LTD., Suwon, Gyunggi-do (KR)

(72) Inventor: Hyung Joon Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 314 days.

(21) Appl. No.: 13/924,474

(22) Filed: Jun. 21, 2013

(65) Prior Publication Data

US 2014/0301014 A1 Oct. 9, 2014

(30) Foreign Application Priority Data

Apr. 8, 2013 (KR) .......................... 10-2013-0038322

(51) Int. Cl.
| | |
|---|---|
| *H01G 4/005* | (2006.01) |
| *H01G 4/30* | (2006.01) |
| *H01G 4/012* | (2006.01) |
| *H01G 4/12* | (2006.01) |
| *H01G 4/232* | (2006.01) |

(52) U.S. Cl.
CPC .................. *H01G 4/30* (2013.01); *H01G 4/012* (2013.01); *H01G 4/12* (2013.01); *H01G 4/232* (2013.01)

(58) Field of Classification Search
USPC ........................................ 361/301.4, 303, 311
See application file for complete search history.

(56) References Cited

U.S. PATENT DOCUMENTS

| | | | |
|---|---|---|---|
| 7,190,566 B2 * | 3/2007 | Tonogai | H01G 4/30 361/303 |
| 2007/0025055 A1 | 2/2007 | Mizuno et al. | |
| 2012/0229950 A1 | 9/2012 | Kim et al. | |
| 2012/0250221 A1 | 10/2012 | Yamashita | |
| 2013/0140946 A1 | 6/2013 | Banno et al. | |

FOREIGN PATENT DOCUMENTS

JP 2005-045094 A 2/2005
(Continued)

OTHER PUBLICATIONS

Korean Office Action issuedn in Korea Application No. 10-2013-0038322 dated Apr. 22, 2014, w/English translation.
(Continued)

*Primary Examiner* — Eric Thomas
(74) *Attorney, Agent, or Firm* — McDermott Will & Emery LLP (57) ABSTRACT

There is provided a multilayer ceramic capacitor including a ceramic body having first and second side surfaces facing each other, and third and fourth end surfaces connecting the first and second side surfaces, a plurality of internal electrodes formed in the ceramic body and having one ends thereof exposed to the third end surface or the fourth end surface, and first and second side margin parts formed from the first and second side surfaces to edges of the internal electrodes, wherein in a width direction of the ceramic body, both edges of the internal electrodes include oxide regions, the oxidation regions of an internal electrode contributing to capacitance formation except for uppermost and lowermost internal electrodes among the internal electrodes have a maximum length Lmax of 3 μm or less, and a standard deviation in length is 1 μm or less.

4 Claims, 7 Drawing Sheets

(56) References Cited

FOREIGN PATENT DOCUMENTS

| | | |
|---|---|---|
| JP | 2007-35850 A | 2/2007 |
| JP | 2011-023707 A | 2/2011 |
| KR | 10-1120004 B1 | 2/2012 |
| KR | 10-1141342 B1 | 5/2012 |
| WO | 2011/071144 A1 | 6/2011 |
| WO | 2011/114809 A1 | 9/2011 |

OTHER PUBLICATIONS

Japanese Decision of Rejection issued in counterpart Japanese Patent Application No. 2013-122443 on Dec. 9, 2014; 5 pages including English translation.

Office Action Japanese Patent Application No. 2013-122443 dated Jan. 21, 2014 with English translation.

* cited by examiner

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2013-0038322 filed on Apr. 8, 2013, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a high capacitance multilayer ceramic capacitor having excellent dielectric properties and a method of manufacturing the same.

2. Description of the Related Art

Generally, electronic components using a ceramic material, such as a capacitor, an inductor, a piezoelectric element, a varistor, a thermistor, or the like, include a ceramic body made of a ceramic material, internal electrodes formed in the ceramic body, and external electrodes mounted on external surfaces of the ceramic body so as to be connected to the internal electrodes.

Among ceramic electronic components, a multilayer ceramic capacitor includes a plurality of stacked dielectric layers, internal electrodes disposed to face each other, having the dielectric layer therebetween, and external electrodes electrically connected to the internal electrodes.

Multilayer ceramic capacitors have been widely used as components in mobile communications devices such as laptop computers, personal digital assistants (PDAs), mobile phones, and the like, due to advantages thereof such as a small size, high capacitance, ease of mounting, or the like.

Recently, as electronic products have been miniaturized and multi-functionalized, chip components have also tended to be miniaturized and multi-functionalized. As a result, there is a need to miniaturize multilayer ceramic capacitors and increase the capacity thereof.

In general, multilayer ceramic capacitors have been manufactured as follows. First, a ceramic green sheet is prepared, and a conductive paste is printed on the ceramic green sheet to form the internal electrode. The ceramic green sheets having the internal electrodes formed thereon are stacked in an amount of several tens of layers to several hundreds of layers to fabricate a green ceramic multilayer body. Thereafter, the green ceramic multilayer body is compressed under conditions of high temperature and high pressure to fabricate a hard green ceramic multilayer body, and a cutting process is performed on the ceramic multilayer body to fabricate a green chip. Next, the green chip is calcined and sintered, and the external electrodes are formed thereon to complete the multilayer ceramic capacitor.

In the case in which the multilayer ceramic capacitor is formed by the above-mentioned method, a length of an oxide layer at an edge of the internal electrode may be irregularly formed, such that dielectric properties may be significantly deteriorated.

The following Related Art Document discloses a multilayer ceramic capacitor in which an occupation rate of an abnormal region formed by solid-solubilizing a metal oxide in length and height directions of both edges of an internal electrode is 85% or more in order to suppress degradation in insulation resistance of a ceramic electronic component. However, a length of an oxide layer in both edges of the internal electrode in a width direction is not controlled, such that deterioration in dielectric properties may be not still prevented.

RELATED ART DOCUMENT (Patent Document 1) JP 2011-023707

SUMMARY OF THE INVENTION

An aspect of the present invention provides a high capacitance multilayer ceramic capacitor having excellent dielectric properties, and a method of manufacturing the same.

According to an aspect of the present invention, there is provided a multilayer ceramic capacitor including: a ceramic body having first and second side surfaces facing each other, and third and fourth end surfaces connecting the first and second side surfaces; a plurality of internal electrodes formed in the ceramic body and having one ends thereof exposed to the third end surface or the fourth end surface; and first and second side margin parts formed from the first and second side surfaces to edges of the internal electrodes, wherein in a width direction of the ceramic body, both edges of the internal electrodes include oxide regions, the oxidation regions of an internal electrode contributing to capacitance formation except for uppermost and lowermost internal electrodes among the internal electrodes have a maximum length Lmax of 3 μm or less, and a standard deviation in length is 1 μm or less.

The first and second side margin parts may have an average thickness of 18 μm or less.

The first and second side margin parts may be formed of ceramic slurry.

The internal electrodes may include a first internal electrode having one end exposed to the third end surface and the other end formed so as to have a predetermined interval from the fourth end surface, and a second internal electrode having one end exposed to the fourth end surface and the other end formed so as to have a predetermined interval from the third end surface.

According to another aspect of the present invention, there is provided a method of manufacturing a multilayer ceramic capacitor, the method including: preparing a first ceramic green sheet including a plurality of stripe shaped first internal electrode patterns having a predetermined interval therebetween and a second ceramic green sheet including a plurality of stripe shaped second internal electrode patterns having a predetermined interval therebetween; forming a ceramic green sheet multilayer body by stacking the first and second ceramic green sheets such that the stripe shaped first internal electrode patterns and the stripe shaped second internal electrode patterns intersect with each other; cutting the ceramic green sheet multilayer body while traversing the stripe shaped first and second internal electrode patterns such that first and second internal electrodes have a predetermined width and side surfaces to which edges thereof are exposed in a width direction; and forming first and second side margin parts on the side surfaces to which the edges of the first and second internal electrodes are exposed, respectively, by using ceramic slurry, wherein in a width direction of the ceramic body, both edges of the internal electrodes include oxide regions, the oxidation regions of an internal electrode contributing to capacitance formation except for uppermost and lowermost internal electrodes among the internal electrodes have a maximum length Lmax of 3 μm or less, and a standard deviation in length is 1 μm or less.

In the forming of the ceramic green sheet multilayer body, the ceramic green sheets may be stacked such that a central portion of the stripe shaped first internal electrode pattern and the predetermined interval between the stripe shaped second internal electrode patterns are overlapped with each other.

The cutting of the ceramic green sheet multilayer body may include: cutting the ceramic green sheet multilayer body into bar shaped multilayer bodies, each having the side surfaces to which edges of the first and second internal electrodes are exposed: and cutting a central portion of the first internal electrode and a predetermined interval between the second internal electrodes along the same cutting line to form the multilayer bodies each having third and fourth end surfaces to which one ends of the first and second internal electrodes are exposed, respectively, after the forming of the first and second side margin parts.

The cutting of the ceramic green sheet multilayer body may include: cutting the ceramic green sheet multilayer body into bar shaped multilayer bodies each having the side surfaces to which the edges of the first and second internal electrodes are exposed, and cutting a central portion of the first internal electrode and a predetermined interval between the second internal electrodes in the bar shaped multilayer body along the same cutting line to form the multilayer bodies each having third and fourth end surfaces to which one ends of the first and second internal electrodes are exposed, respectively, and the forming of the first and second side margin parts may be performed on the multilayer bodies.

The forming of the first and second side margin parts may be performed by applying the ceramic slurry to the side surfaces to which the edges of the first and second internal electrodes are exposed.

The forming of the first and second side margin parts may be performed by dipping the side surfaces to which the edges of the first and second internal electrodes are exposed in the ceramic slurry.

The first and second side margin parts may have an average thickness of 18 µm or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
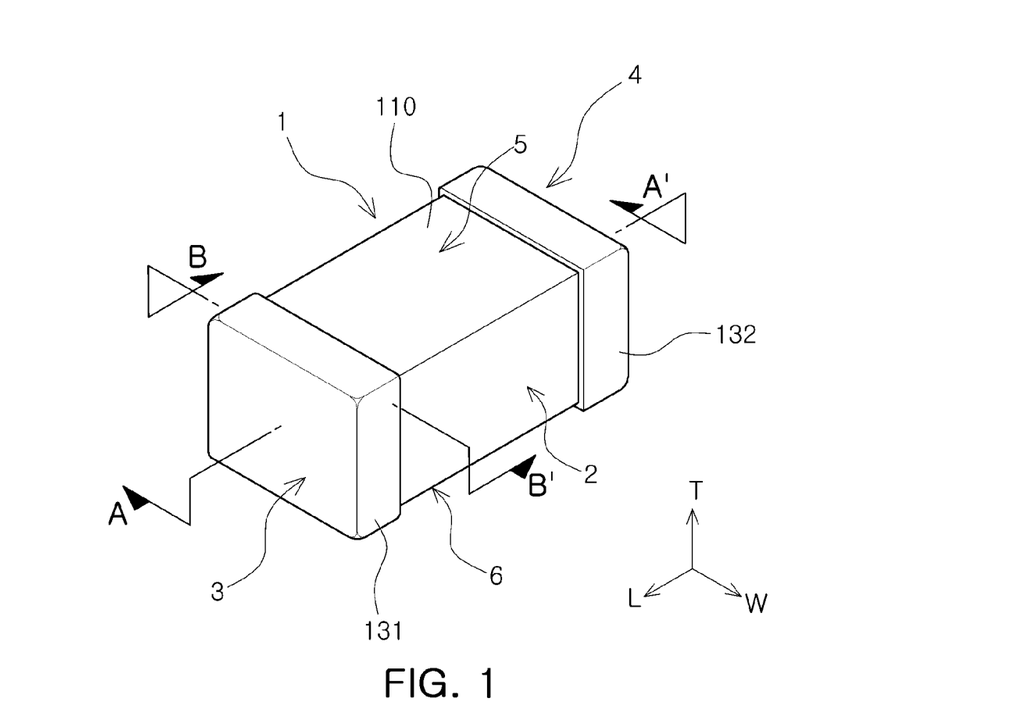
FIG. 1 is a schematic perspective view showing a multilayer ceramic capacitor according to an embodiment of the present invention.

FIG. 1 is a schematic perspective view showing a multilayer ceramic capacitor according to an embodiment of the present invention.

Figure 2:
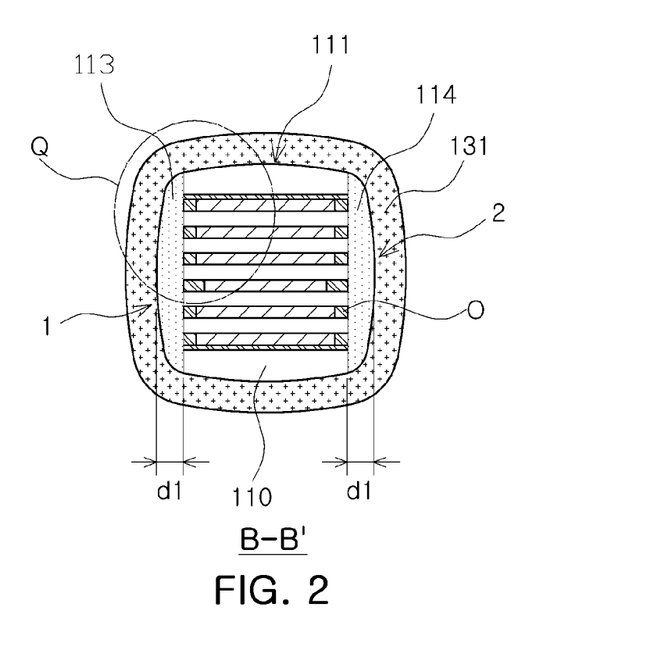
FIG. 2 is a cross-sectional view taken along line B-B' of FIG. 1.

FIG. 2 is a cross-sectional view taken along line B-B' of FIG. 1.

Figure 3:
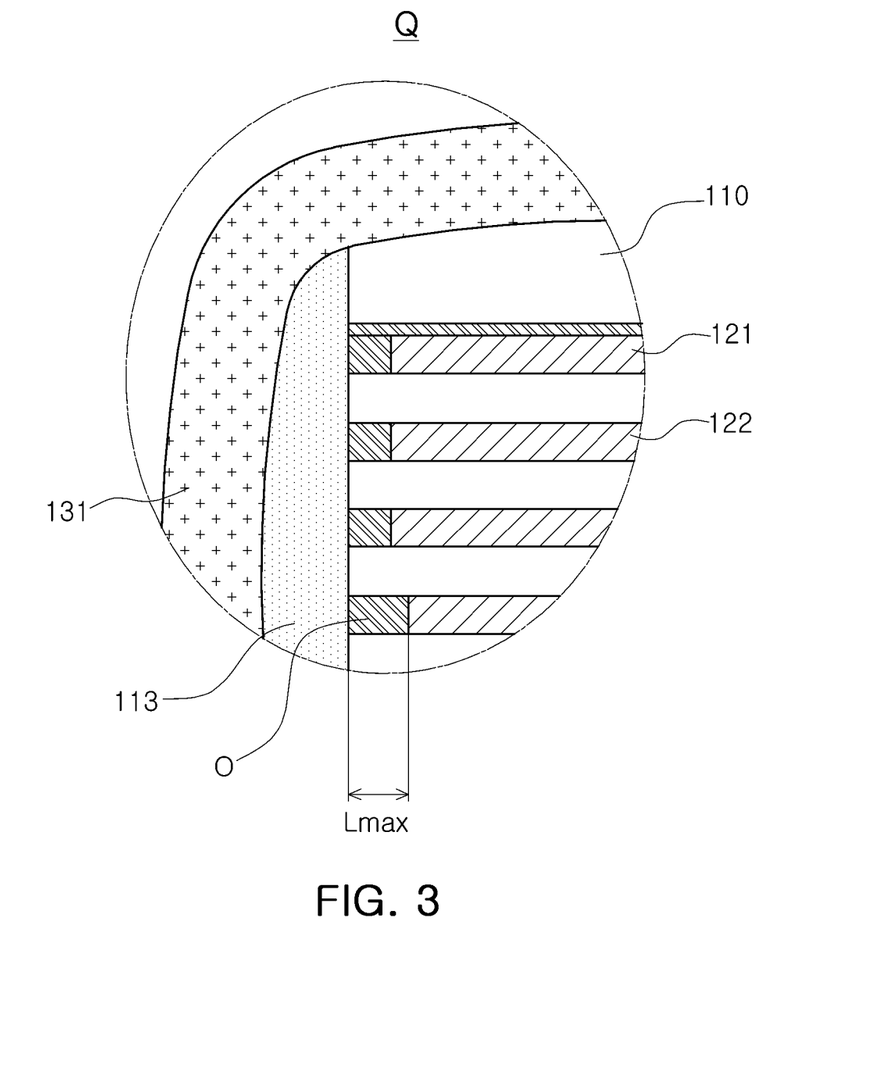
FIG. 3 is an enlarged view of region Q of FIG. 2.

FIG. 3 is an enlarged view of region Q of FIG. 2.

Figure 4:
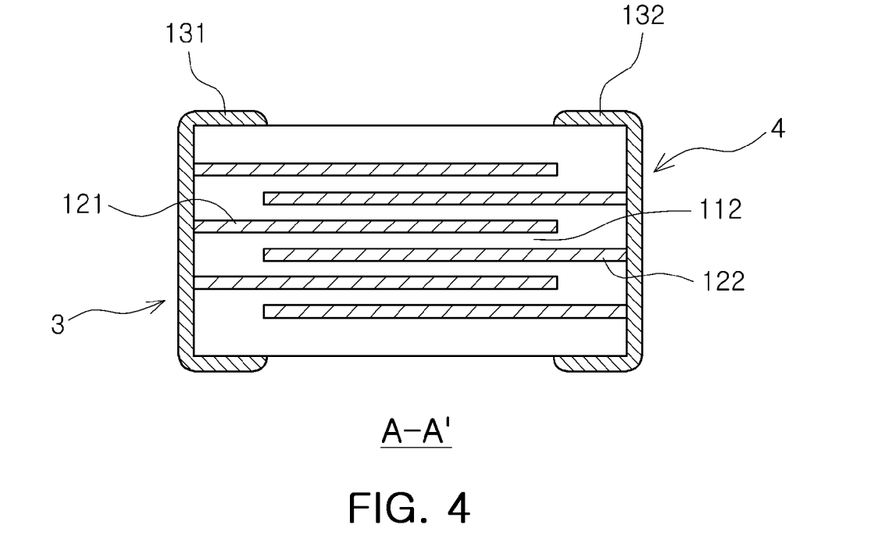
FIG. 4 is a cross-sectional view taken along line A-A' of FIG. 1.
Figure 5:
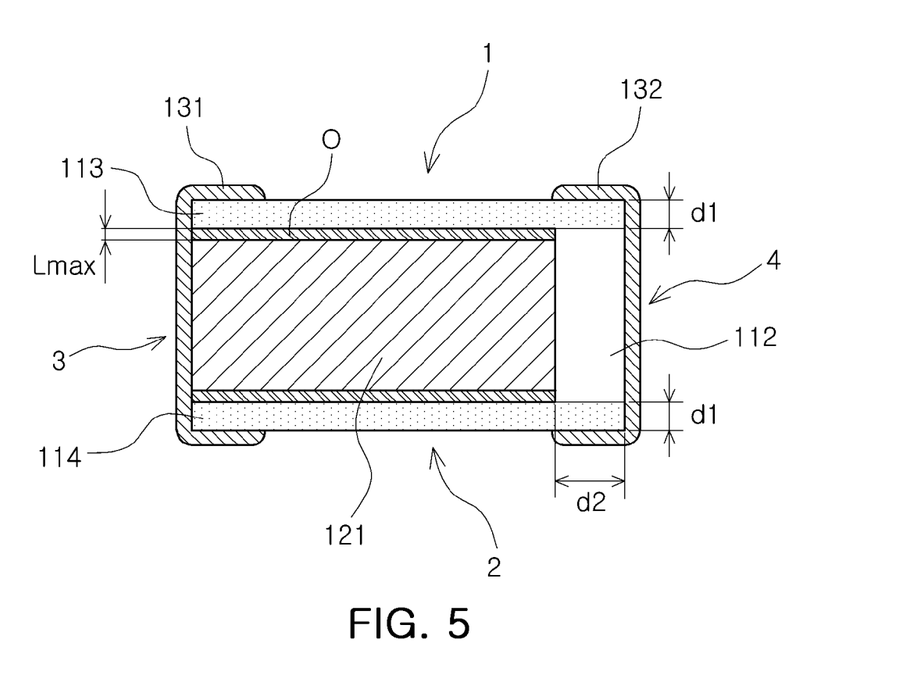
FIG. 5 is an upper plan view showing one dielectric layer configuring the multilayer ceramic capacitor shown in FIG. 1.

FIG. 4 is a cross-sectional view taken along line A-A' of FIG. 1, and FIG. 5 is an upper plan view showing one dielectric layer configuring the multilayer ceramic capacitor shown in FIG. 1.

Referring to FIGS. 1 through 5, the multilayer ceramic capacitor according to the embodiment of the present invention may include a ceramic body 110; a plurality of internal electrodes 121 and 122 formed in the ceramic body; and external electrodes 131 and 132 formed on an outer surface of the ceramic body.

The ceramic body 110 may have a first side surface 1 and a second side surface 2 opposing each other, and a third end surface 3 and a fourth end surface 4 connecting the first side surface and the second side surface to each other.

The ceramic body 110 is not specifically limited in view of a shape, but may generally have a rectangular parallelepiped shape.

The plurality of internal electrodes 121 and 122 formed in the ceramic body 110 may have respective one ends exposed to the third end surface 3 or the fourth end surface 4 of the ceramic body.

The internal electrodes 121 and 122 may be configured of a pair of a first internal electrode 121 and a second internal electrode 122 having opposing polarities. One end of the first internal electrode 121 may be exposed to the third end surface 3 and one end of the second internal electrode 122 may be exposed to the fourth end surface 4. The other ends of the first internal electrode 121 and the second internal electrode 122 may be formed so as to have a predetermined interval from the third end surface 3 or the fourth end surface 4. A more detailed description thereof will be described below.

The third end surface 3 and the fourth end surface 4 of the ceramic body may have the first and second external electrodes 131 and 132 formed thereon to be electrically connected to the internal electrodes.

The plurality of internal electrodes may be formed in the ceramic body, and a distance d1 from respective edges of the plurality of internal electrodes to the first side surface or the second side surface may be 18 µm or less. This means that the distance d1 from the edge of the plurality of internal electrodes to the first side surface or the second surface is 18 µm or less on average.

The edges of the internal electrode may be sides of the internal electrode adjacent to the first side surface 1 or the second side surface 2 of the ceramic body. A region from the edge of the internal electrode to the first side surface or the second side surface may refer to a first side margin part 113 or a second side margin part 114.

The distance d1 from the edge of the internal electrode to the first side surface 1 or the second side surface 2 may be slightly different between the plurality of internal electrodes, but according to the embodiment of the present invention, the difference in the distance d1 may be small or may not be generated. The above-described features may be more clearly appreciated through a method of manufacturing a multilayer ceramic capacitor according to an embodiment of the present invention.

According to the embodiment of the present invention, the ceramic body 110 may include a multilayer body 111 having a plurality of dielectric layers 112 stacked therein and the first side margin part 113 and the second side margin part 114 formed on both side surfaces of the multilayer body. In this case, the distance d1 from respective edges of the plurality of internal electrodes to the first side surface or the second side surface is formed by the first side margin part 113 and the second side margin part 114 and corresponds to a thickness of the first side margin part 113 or the second side margin part 114.

The plurality of dielectric layers 112 configuring the multilayer body 111 may be in a sintered state and be integrated so as not to confirm a boundary between the adjacent dielectric layers.

A length of the multilayer body 111 corresponds to a length of the ceramic body 110, and the length of the ceramic body 110 corresponds to a distance from the third end surface 3 to the fourth end surface 4 of the ceramic body. That is, the third and fourth end surfaces of the ceramic body 110 may be appreciated as being the third end surface and the fourth end surface of the multilayer body 111.

The multilayer body 111 is formed by stacking the plurality of dielectric layers 112, and a length of the dielectric layer 112 corresponds to the distance from the third end surface 3 to the fourth end surface 4 of the ceramic body.

The length of the ceramic body according to the embodiment of the present invention may be 400 to 1400 μm, but the present invention is not limited thereto. More specifically, the length of the ceramic body may be 400 to 800 μm, or 600 to 1400 μm.

The internal electrodes 121 and 122 may be formed on the dielectric layer and be formed in the ceramic body while having one dielectric layer therebetween through sintering.

According to the embodiment of the present invention, both edges of the internal electrodes 121 and 122 may include oxide regions O in a width direction of the ceramic body 110, wherein the oxidation regions O of an internal electrode contributing to capacitance formation except for the uppermost and lowermost internal electrodes among the internal electrodes 121 and 122 respectively have a maximum length Lmax of 3 μm or less, and a standard deviation in length may be 1 μm or less.

The oxidation regions O may be formed by a reaction between a metal oxide contained in ceramics configuring the dielectric layer 112 and a metal configuring the internal electrodes 121 and 122 during sintering or heat-treating the ceramic body 110.

The oxidation regions O may contain the metal oxide, and the metal oxide is not particularly limited, but may be, for example, an oxide of at least one selected from a group consisting of magnesium (Mg), manganese (Mn), nickel (Ni), lithium (Li), silicon (Si), titanium (Ti), and barium (Ba).

The oxidation regions O may be observed by an electron microscope and have a color different from that of the internal electrode to thereby be distinguished from the internal electrode.

In FIGS. 2, 3, and 5, the oxidation regions O may be represented by different lines from those of the internal electrodes 121 and 122 in order to distinguish the oxidation regions from the internal electrodes 121 and 122.

The oxidation regions O may respectively have a maximum length Lmax of 3 μm or less, and the standard deviation in length may be 1 μm or less.

According to the embodiment of the present invention, the maximum length Lmax of the respective oxidation regions O is controlled to be 3 μm or less and the standard deviation in length is controlled to be 1 μm or less, such that a non-uniform formation of the oxidation region O may be blocked, thereby blocking deterioration in dielectric properties.

That is, a high capacitance multilayer ceramic capacitor having excellent dielectric properties may be implemented by controlling the length of the oxidation region and allowing for a uniform distribution of the oxidation region.

In the case in which the maximum length Lmax of the respective oxidation regions O is more than 3 μm, the capacitance of the multilayer ceramic capacitor may be deteriorated, and a crack may be generated in a junction part at which the ends of the internal electrode and the first or second side margin part 113 or 114 contact each other.

Further, in the case in which the standard deviation in length of the oxidation region O is more than 1 μm, the oxidation region is uniformly formed, such that dielectric properties may be deteriorated.

According to the embodiment of the present invention, a method of controlling the maximum length Lmax of the oxidation region O to be 3 μm or less and controlling the standard deviation in length to be 1 μm or less is not particularly limited, but may be implemented, for example, by controlling oxidation partial pressure at the time of sintering the ceramic body.

At the time of measuring the maximum length Lmax of the respective oxidation regions O and the standard deviation in length, the measurement may be performed on only oxidation regions of internal electrodes contributing to capacitance formation, except for the uppermost and lowermost internal electrodes among the plurality of internal electrodes 121 and 122.

The oxidation regions O may be formed in both edges of the internal electrodes 121 and 122 in the width direction of the ceramic body 110, but in the case of the uppermost and lowermost internal electrodes among the plurality of internal electrodes 121 and 122, oxidation regions may be formed in the entirety of the uppermost and lowermost internal electrodes.

In this case, the uppermost and lowermost internal electrodes among the plurality of internal electrodes 121 and 122 may not contribute to capacitance formation of the multilayer ceramic capacitor due to the oxidation regions.

That is, since the oxidation regions may be formed in the entirety of the uppermost and lowermost internal electrodes, the uppermost and lowermost internal electrodes are excluded at the time of measuring the maximum length Lmax of the respective oxidation regions O and the standard deviation in length.

The maximum length Lmax of the respective oxidation regions O and the standard deviation in length may be measured from an image obtained by scanning a cross-section of the ceramic body 110 in the width direction thereof using a scanning electron microscope (SEM) as shown in FIG. 2.

For example, as shown in FIG. 2, the maximum length Lmax and the standard deviation in length may be obtained by measuring lengths of oxidation regions of internal electrodes contributing to capacitance formation except for the uppermost and lowermost internal electrodes among the plurality of internal electrodes 121 and 122 from an image obtained by scanning the cross-section of the ceramic body 110 in a width-thickness (W-T) direction using the scanning electron microscope (SEM).

Referring to FIG. 5, the first internal electrode 121 may be formed on the dielectric layer 112. The first internal electrode 121 is not entirely formed in a length direction of the dielectric layer. That is, one end of the first internal electrode 121 may be formed to have a predetermined interval d2 from the fourth end surface 4 of the ceramic body, and the other end of the first internal electrode 121 may be formed to the third end surface 3 to thereby be exposed to the third end surface 3.

The other end of the first internal electrode exposed to the third end surface 3 of the multilayer body may be connected to the first external electrode 131.

Contrary to the first internal electrode, one end of the second internal electrode 122 may be formed so as to have a predetermined interval from the third end surface 3, and the other end of the second internal electrode 122 may be exposed to the fourth end surface 4 to thereby be connected to the second external electrode 132.

The dielectric layer 112 may have the same width as that of the first internal electrode 121. That is, the first internal electrode 121 may be entirely formed on the dielectric layer 112 in the width direction of the dielectric layer 112. The width of the dielectric layer and the width of the internal electrode may be based on the first and second side surfaces of the ceramic body.

Although not limited thereto, according to the embodiment of the present invention, the width of the dielectric layer and the width of the internal electrode may be 100 to 900 μm. In more detail, the width of the dielectric layer and the width of the internal electrode may be 100 to 500 μm or 100 to 900 μm.

As the ceramic body is miniaturized, the thickness of the side margin part may have an influence on electrical properties of the multilayer ceramic capacitor. According to the embodiment of the present invention, the thickness of the side margin part is formed to be 18 μm or less, thereby improving the electrical properties of the miniaturized multilayer ceramic capacitor.

In the embodiment of the present invention, the internal electrode and the dielectric layer may be cut simultaneously, such that the width of the internal electrode may be equal to that of the dielectric layer. A more detailed description thereof will be described below.

In the embodiment of the present invention, the width of the dielectric layer is the same as the width of the internal electrode, and the edges of the internal electrode may be exposed to the first and second side surfaces of the multilayer body. Both side surfaces of the multilayer body to which the edges of the internal electrode are exposed may be provided with the first side margin part 113 and the second side margin part 114.

As described above, the distance d1 from the respective edges of the plurality of internal electrodes to the first side surface or the second side surface corresponds to the thickness of the first side margin part 113 or the second side margin part 114.

The first side margin part 113 and the second side margin part 114 may have a thickness of 18 μm or less. As the thickness of the first side margin part 113 or the second side margin part 114 is reduced, an overlap area of the internal electrodes formed in the ceramic body may be relatively increased.

As long as the first side margin part 113 and the second side margin part 114 have a thickness sufficient to prevent short circuits of the internal electrodes exposed to the side surfaces of the multilayer body 111, the thickness of the first side margin part 113 or the second side margin part 114 is not particularly limited. For example, the first side margin part 113 and the second side margin part 114 may have a thickness of 2 μm or more.

When the thickness of the first and second side margin parts is less than 2 μm, mechanical strength against external impacts may be deteriorated, and when the thickness of the first and second side margin parts is more than 18 μM, the overlap area of the internal electrodes is relatively decreased, such that it may be difficult to secure high capacitance of the multilayer ceramic capacitor.

According to the embodiment of the present invention, the first and second side margin parts 113 and 114 may be formed of ceramic slurry. The thickness of the first and second side margin parts 113 and 114 may be easily controlled by controlling an amount of ceramic slurry and may be thinly formed to be 18 μm or less.

The thickness of the first side margin part 113 and the second side margin part 114 may mean an average thickness of the margin parts.

The average thickness of the first side margin part 113 and the second side margin part 114 may be measured by scanning an image of the cross-section of the ceramic body 110 in the width direction thereof using a scanning electron microscope (SEM).

For example, as shown in FIG. 2, with respect to the first side margin part 113 and the second side margin part 114 extracted from the image obtained by scanning the cross-section of the ceramic body 110 in a width-thickness (W-T) direction using the SEM as shown in FIG. 2, thicknesses at any three points of the upper, middle, and lower portions of either of the margin parts in the thickness direction of the ceramic body may be measured to obtain an average value.

In order to significantly increase the capacitance of the multilayer ceramic capacitor, methods for thinning the dielectric layers, stacking the thinned dielectric layers, and improving coverage of the internal electrodes have been considered. In addition, a method of increasing an overlap area of the internal electrodes forming capacitance has been considered. In order to increase the overlap area of the internal electrodes, the margin parts in which the internal electrodes are not formed are significantly decreased. In particular, as the multilayer ceramic capacitor is miniaturized, the margin parts need to be significantly decreased in order to increase the overlap area of the internal electrodes.

According to the embodiment of the present invention, the internal electrode is formed across the entire dielectric layer in the width direction thereof, and the thickness of the side margin part is set to be 18 μm or less, such that the overlap area of the internal electrodes is large.

In general, as the dielectric layers are highly stacked, the thicknesses of the dielectric layer and the internal electrode are reduced. Therefore, short-circuits between the internal electrodes may frequently occur. In addition, in the case in which the internal electrode is partially formed on the dielectric layer, a step portion may be generated by the internal electrode to deteriorate accelerated life span or reliability of an insulation resistance.

However, according to the embodiment of the present invention, even in the case that internal electrode and the dielectric layer are formed to have a reduced thickness, since the internal electrode is entirely formed across the dielectric layer in the width direction thereof, the overlap area of the internal electrodes may be increased to significantly increase the capacitance of the multilayer ceramic capacitor.

In addition, the step portion generated by the internal electrode is decreased to improve the accelerated life span of the insulation resistance, such that a multilayer ceramic capacitor having excellent capacitance properties and excellent reliability can be provided.

Hereinafter, a method of manufacturing a multilayer ceramic capacitor according to an embodiment of the present invention will be described.

FIGS. 6A through 6F are cross-sectional views and perspective views schematically showing a method of manufacturing a multilayer ceramic capacitor according to an embodiment of the present invention.

Figure 6A:
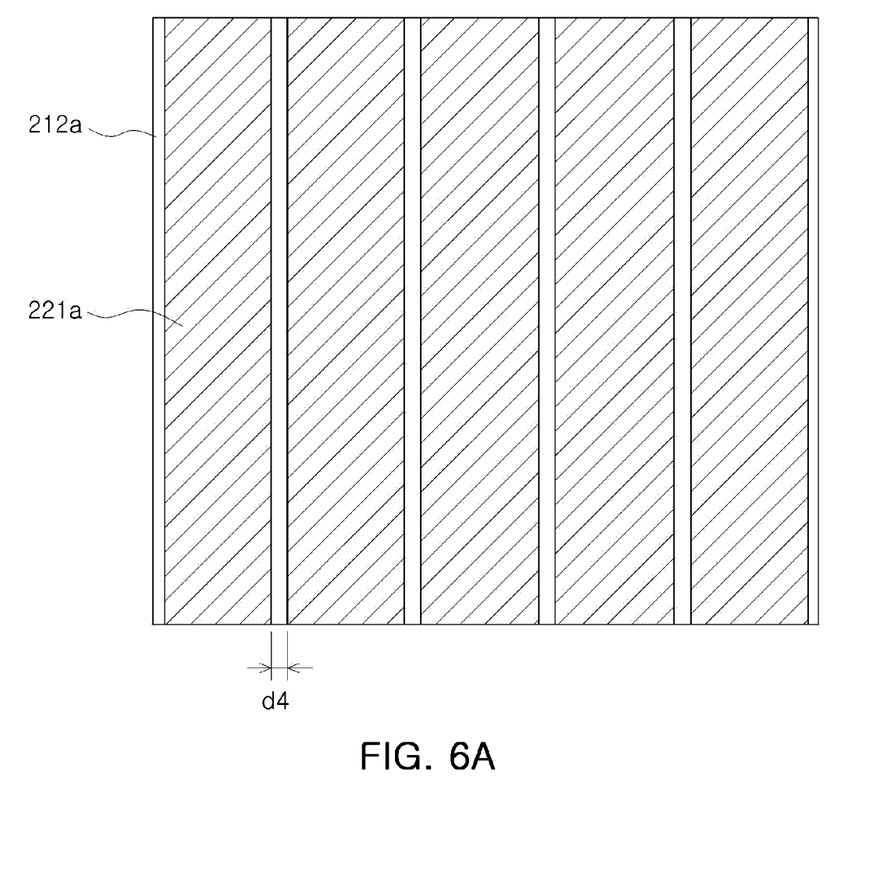
FIGS. 6A through 6F are cross-sectional views and perspective views schematically showing a method of manufacturing a multilayer ceramic capacitor according to an embodiment of the present invention.

As shown in FIG. 6A, a plurality of stripe shaped first internal electrode patterns 221a may be formed on a ceramic green sheet 212a, having a predetermined interval d4 therebetween. The plurality of stripe shaped first internal electrode patterns 221a may be formed in parallel with each other.

The predetermined interval d4, corresponding to a distance for insulation between the internal and external electrodes having different polarities, may be a distance d2×2 shown in FIG. 5.

The ceramic green sheet 212a may be formed of a ceramic paste including ceramic powder, an organic solvent, and an organic binder.

The ceramic powder may be a material having high permittivity, and for example, a barium titanate ($BaTiO_3$)-based material, a lead complex perovskite-based material, a strontium titanate ($SrTiO_3$)-based material, or the like, may be used, but the present invention is not limited thereto. Among them, barium titanate ($BaTiO_3$) powder may be preferable. The ceramic green sheet 212a may be sintered to be the dielectric layer 112 configuring the ceramic body.

The stripe shaped first internal electrode patterns 221a may be formed of an internal electrode paste including a conductive metal. The conductive metal may be Ni, Cu, Pd, or an alloy thereof, but is not limited thereto.

A method of forming the stripe shaped first internal electrode patterns 221a on the ceramic green sheet 212a is not particularly limited, but for example, a printing method such as a screen printing method or a gravure printing method may be used.

Further, although not shown, a plurality of stripe shaped second internal electrode patterns 222a may be formed on another ceramic green sheet 212a, having a predetermined interval therebetween.

Hereinafter, the ceramic green sheet having the first internal electrode patterns 221a formed thereon may refer to a first ceramic green sheet and the ceramic green sheet having the second internal electrode patterns 222a formed thereon may refer to a second ceramic green sheet.

Figure 6B:
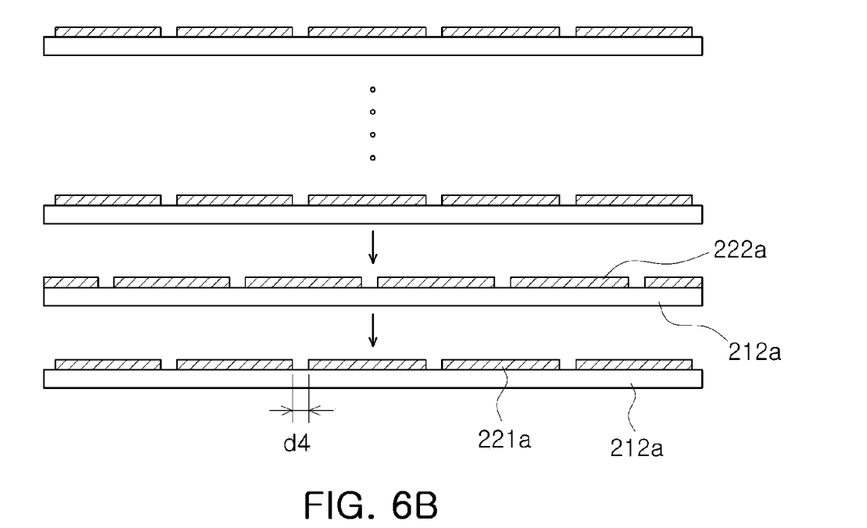

Next, as shown in FIG. 6B, the first and second ceramic green sheets may be alternately stacked so that the stripe shaped first internal electrode patterns 221a and the stripe shaped second internal electrode patterns 222a intersect with one another.

Thereafter, the stripe shaped first internal electrode patterns 221a may form the first internal electrodes 121, and the stripe shaped second internal electrode patterns 222a may form the second internal electrodes 122.

Figure 6C:
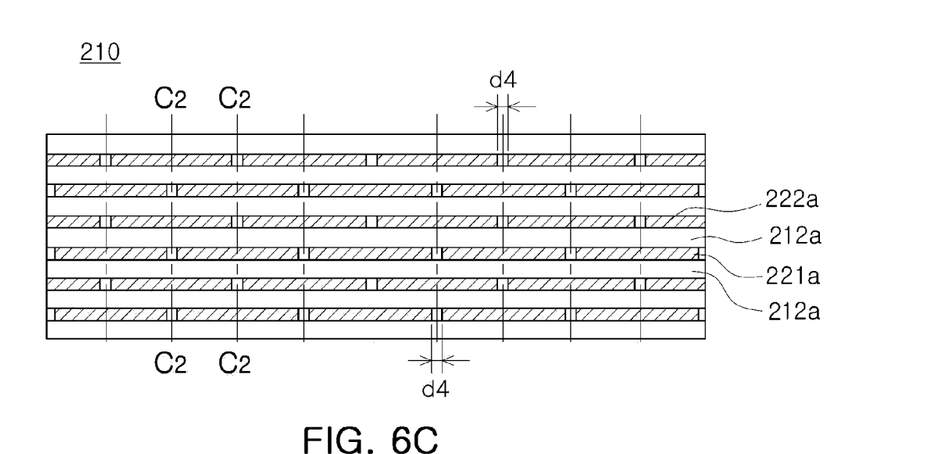
Figure 6D:
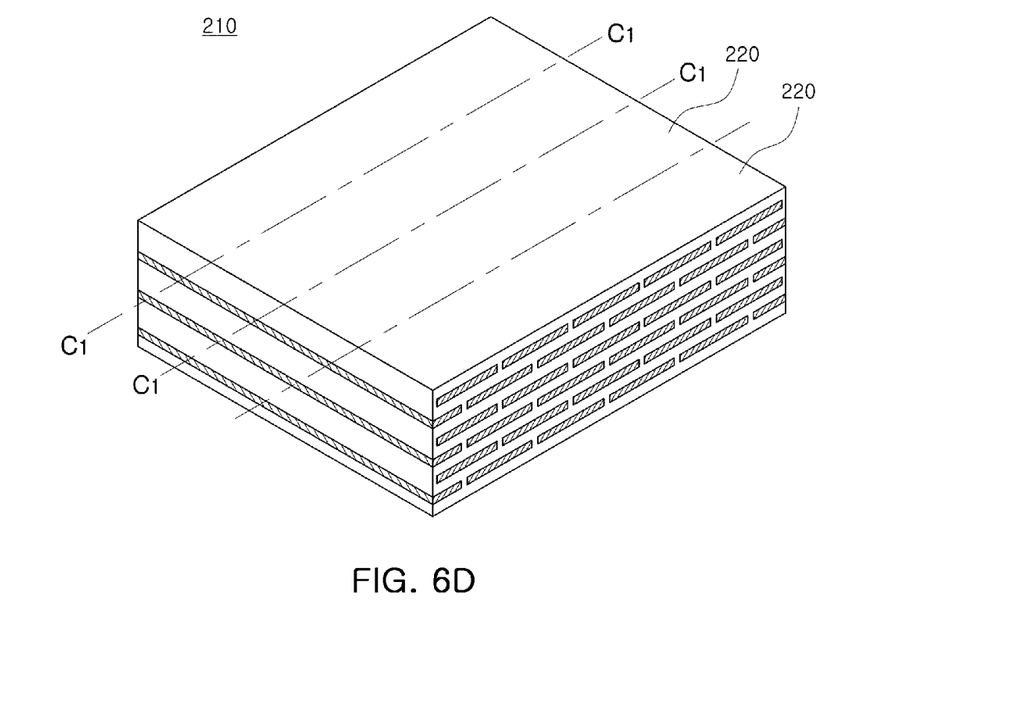

FIG. 6C is a cross-sectional view showing a ceramic green sheet multilayer body 210 having the first and second ceramic green sheets stacked therein according to the embodiment of the invention, and FIG. 6D is a perspective view showing the ceramic green sheet multilayer body 210 having the first and second ceramic green sheets stacked therein according to the embodiment of the invention.

Referring to FIGS. 6C and 6D, the first ceramic green sheet having the plurality of stripe shaped first internal electrode patterns 221a printed thereon in parallel with each other and the second ceramic green sheet having the plurality of stripe shaped second internal electrode patterns 222a printed thereon in parallel with each other are alternately stacked.

In more detail, the first and second ceramic green sheets are alternately stacked such that a central portion of the stripe shaped first internal electrode pattern 221a printed on the first ceramic green sheet and the interval d4 between the stripe shaped second internal electrode patterns 222a printed on the second ceramic green sheet may be overlapped with each other.

Then, as shown in FIG. 6D, the ceramic green sheet multilayer body 210 may be cut to traverse the plurality of stripe shaped first internal electrode patterns 221a and the plurality of stripe shaped second internal electrode patterns 222a. That is, the ceramic green sheet multilayer body 210 may be cut along a cutting line C1-C1, such that a bar shaped multilayer body 220 may be formed.

More specifically, the stripe shaped first internal electrode patterns 221a and the stripe shaped second internal electrode patterns 222a may be cut in the length direction to be divided into a plurality of internal electrodes having a predetermined width. Here, the stacked ceramic green sheets are cut together with the internal electrode patterns. Therefore, the dielectric layer may be formed to have the same width as that of the internal electrode.

Through the cut surface of the bar shaped multilayer body 220, edges of the first and second internal electrodes may be exposed. The cut surface of the bar shaped multilayer body may refer to the first side surface and the second side surface of the bar shaped multilayer body, respectively.

The ceramic green sheet multilayer body may be sintered and then be cut into bar shaped multilayer bodes. In addition, after the ceramic green sheet multilayer body is cut into the bar shaped multilayer bodies, a sintering process may be performed. Although not limited thereto, the sintering process may be performed at 1100 to 1300° C. under $N_2$—$H_2$ atmosphere.

Figure 6E:
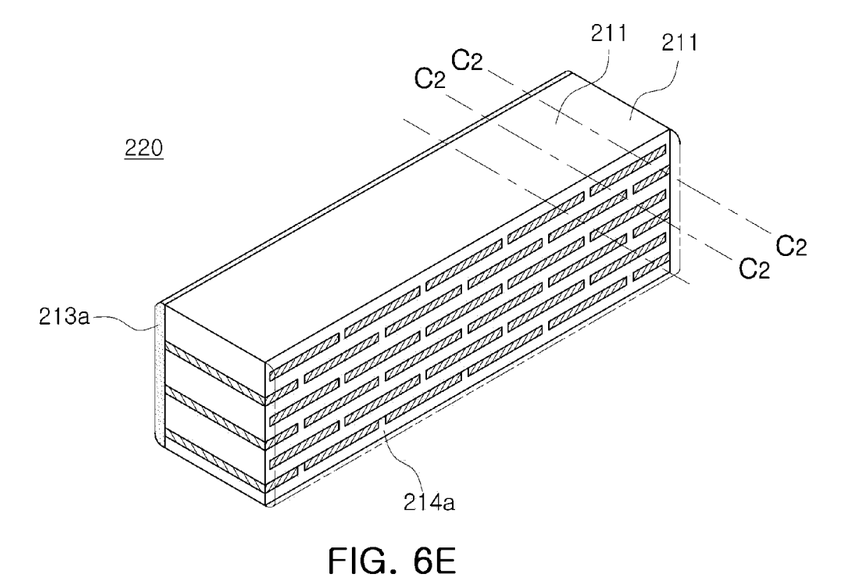

Next, as shown in FIG. 6E, the first and second side surfaces of the bar shaped multilayer body 220 may be provided with a first side margin part 213a and a second side margin part 214a, respectively. The second side margin part 214a is not clearly shown, but the outline thereof is shown by dotted lines.

The first and second side surfaces of the bar shaped multilayer body 220 may be considered to be surfaces corresponding to the first and the second side surfaces 1 and 2 of the multilayer body 111 shown in FIG. 5.

The first and second side margin parts 213a and 214a may be formed on the bar shaped multilayer body 220 using ceramic slurry including ceramic powder.

The ceramic slurry may include the ceramic powder, an organic binder, and an organic solvent, and an amount of the ceramic slurry may be controlled to allow the first and second side margin parts 213a and 214a to have a desired thickness.

The first and second side margin parts 113a and 114a may be formed by applying the ceramic slurry to the first and second side surfaces of the bar shaped multilayer body 220. A method of applying the ceramic slurry is not particularly limited. For example, the ceramic slurry may be sprayed by a spraying method or may be applied using a roller.

In addition, the first and second side margin parts 213a and 214a may be formed on the first and second side surfaces of the bar shaped multilayer body by dipping the bar shaped multilayer body into the ceramic slurry.

As described above, the first side margin part and the second side margin part may have a thickness of 18 μm or less. The thickness of the first and second side margin parts may be defined as a distance from the first and second side surface of the bar shaped multilayer body to which the edges of the internal electrode is exposed.

Figure 6F:
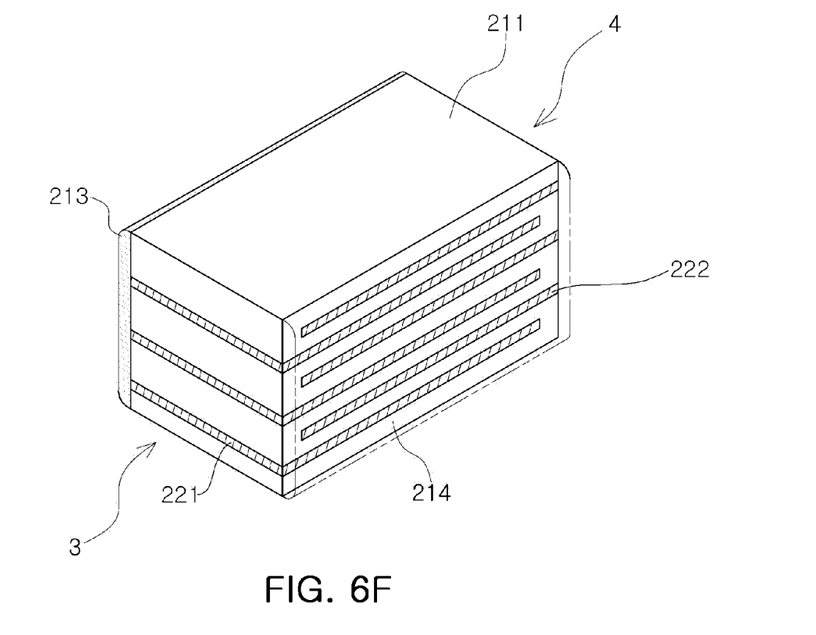

Next, as shown in FIGS. 6E and 6F, the bar shaped multilayer body 220 having the first and second side margin parts 213a and 214a formed thereon may be cut along a cutting line C2-C2 so as to correspond to individual chip size. FIG. 6C may be used to recognize a position of the cutting line C2-C2.

The bar shaped multilayer body 220 is cut to have a chip size, whereby a ceramic body having the multilayer body 211 and the first and second side margin parts 213 and 214 formed on both side surfaces of the multilayer body may be formed.

Since the bar shaped multilayer body 220 is cut along the cutting line C2-C2, the central portion of the first internal electrode and the predetermined interval d4 formed between the second internal electrodes overlapped with each other may be cut along the same cutting line. From a different point of view, the central portion of the second internal electrode and the predetermined interval formed between the first internal electrodes may be cut along the same cutting line.

Therefore, respective one ends of the first internal electrode and the second internal electrode may be alternately exposed to the cutting line C2-C2. A surface to which the first internal electrode is exposed may be the third end surface 3 of the multilayer body shown in FIG. 5, and a surface to which the second internal electrode is exposed may be the fourth end surface 4 of the multilayer body shown in FIG. 5.

The bar shaped multilayer body 220 is cut along the cutting line C2-C2, such that the predetermined interval d4 between the stripe shaped first internal electrode patterns 221a is cut into half, as a result, one end of the first internal electrode 121 may be spaced apart from the fourth end surface by the predetermined interval d2. In addition, the second internal electrode 122 may be spaced apart from the third end surface by a predetermined interval.

Then, the third end surface and the fourth end surface may have external electrodes formed thereon to be connected to one ends of the first and second internal electrodes, respectively.

As described in the embodiment of the present invention, in the case in which the first and second side margin parts are formed on the bar shaped multilayer body 220 and the bar shaped multilayer body 220 is cut into a plurality of multilayer bodies having a chip size, the side margin parts may be formed on the plurality of multilayer bodies 111 through a single process.

In addition, although not shown, the bar shaped multilayer body may be cut to have a chip size to thereby form the plurality of multilayer bodies before the first and second side margin parts are formed.

That is, the bar shaped multilayer body may be cut such that the central portion of the first internal electrode and the predetermined interval formed between the second internal electrodes overlapped with each other are cut along the same cutting line. Therefore, respective one ends of the first internal electrode and the second internal electrode may be alternately exposed to the cut surface.

Then, the first and second side surfaces of the multilayer body may be provided with the first side margin part and the second side margin part. A method of forming the first and second side margin parts has been described above.

Further, the third end surface of the multilayer body to which the first internal electrode is exposed and the fourth end surface of the multilayer body to which the second internal electrode is exposed may have the external electrodes formed thereon, respectively.

According to another embodiment of the invention, the edges of the first and second internal electrodes are exposed through the first and second side surfaces of the multilayer body. The plurality of stacked first and second internal electrodes may be simultaneously cut, such that the edges of the internal electrodes may be positioned on a single straight line. Then, the first and second side surfaces of the multilayer body may be provided simultaneously with the first and second side margin parts. The multilayer body and the first and second side margin parts may form the ceramic body. That is, the first and second side margin parts may form the first and second side surfaces of the ceramic body.

Therefore, according to the embodiment of the present invention, the distance from the edges of the plurality of internal electrodes to the first and second side surfaces of the ceramic body may be uniformly formed. Further, the first and second side margin parts, which are formed of a ceramic paste, may be formed to have a small thickness.

In addition, oxidation regions of internal electrodes contributing to capacitance formation except for the uppermost and lowermost internal electrodes among the plurality of internal electrodes may have a maximum length Lmax of 3 μm or less, and a standard deviation in length may be 1 μm or less by controlling oxygen partial pressure during the sintering process of the ceramic body.

Therefore, according to the embodiment of the present invention, a high capacitance multilayer ceramic capacitor having the excellent dielectric properties may be implemented by controlling the length of the oxidation regions of the edges of the internal electrode and allowing for a uniform distribution of the oxidation regions.

The following Table 1 is a table in which capacitance (dielectric properties) and reliability of multilayer ceramic capacitors according to the maximum length Lmax of the oxidation region of the internal electrode thereof and the standard deviation in length were compared.

TABLE 1

| Sample No. | Average thickness of side margin parts (μm) | Maximum length Lmax of oxidation regions (μm) | Standard deviation in length of oxidation regions | Evaluation of dielectric properties | Evaluation of reliability (The number of chips in which a crack is generated/ the entire number of chips) |
|---|---|---|---|---|---|
| 1 | 18 | 2.4 | 0.5 | ○ | 0/200 |
| 2 | 18 | 2.6 | 0.3 | ○ | 0/200 |
| 3 | 18 | 2.1 | 0.2 | ○ | 0/200 |
| *4 | 18 | 2.8 | 1.2 | X | 2/200 |
| *5 | 18 | 2.9 | 1.1 | X | 1/200 |
| *6 | 18 | 2.5 | 1.2 | X | 2/200 |
| 7 | 18 | 1.5 | 0.3 | ○ | 0/200 |
| 8 | 18 | 1.2 | 0.2 | ○ | 0/200 |
| 9 | 18 | 1.2 | 0.3 | ○ | 0/200 |
| *10 | 16 | 5.2 | 0.6 | X | 1/200 |
| *11 | 16 | 5.9 | 0.7 | X | 3/200 |
| *12 | 16 | 5.3 | 0.3 | X | 3/200 |
| 13 | 16 | 2.5 | 0.6 | ○ | 0/200 |
| 14 | 16 | 1.3 | 0.2 | ○ | 0/200 |
| 15 | 16 | 2.8 | 0.9 | ○ | 0/200 |
| *16 | 14 | 12 | 3.2 | X | 5/200 |
| *17 | 14 | 15 | 4.3 | X | 3/200 |
| *18 | 14 | 10 | 5.1 | X | 3/200 |
| 19 | 14 | 0.8 | 0.1 | ○ | 0/200 |
| 20 | 14 | 1.3 | 0.2 | ○ | 0/200 |

In Table 1, the evaluation of the dielectric properties was performed at 1 kHz and 0.5V, and the evaluation of the reliability was performed by observing whether or not cracks occurred at the time of break down analysis after polishing the chip. More specifically, after the chip was immersed in a Pb bath at 320° C. for 2 seconds, whether or not cracks were generated when a thermal impact was applied was observed.

As shown in Table 1, it may be appreciated that in the case in which the maximum length Lmax of the oxidation regions was 3 μm or less and the standard deviation in length was 1 μm or less, the dielectric properties was improved, such that the high capacitance multilayer ceramic capacitor may be implemented and the reliability may also be improved.

As set forth above, according to the embodiments of the present invention, a high capacitance multilayer ceramic capacitor having excellent dielectric properties may be implemented by controlling the length of oxidation regions in edges of an internal electrode and allowing for a uniform distribution of the oxidation regions in the multilayer ceramic capacitor.

In addition, according to the multilayer ceramic capacitor, the distance from respective edges of the internal electrode to the first side surface or the second side surface may be small. Therefore, the overlap area of the internal electrodes formed in the ceramic body may be largely formed.

Further, the distance from the edge of the internal electrode disposed in the uppermost or lowermost position among internal electrodes (the outermost edge portion from which it may be relatively difficult to remove remaining carbon) to the first side surface or the second side surface is significantly small, such that the remaining carbon may be easily removed. Therefore, concentration distribution of the remaining carbon may be decreased to maintain a uniform micro structure, and the connectivity of the internal electrodes may be improved.

In addition, the shortest distance from the edge of the internal electrode disposed in the uppermost or lowermost position among internal electrodes to the first side surface or the second side surface may be secured at a predetermined thickness to increase the moisture-resistance characteristics, and internal defects may be significantly decreased. Further, at the time of forming the external electrode, possibility that radiation cracks will occur may be decreased, and mechanical strength to the external impacts may be secured.

According to the embodiments of the present invention, the plurality of stacked first and second internal electrodes, and the ceramic green sheets may be simultaneously cut, such that the edges of the internal electrode may be positioned on a single straight line. Then, the surfaces to which the edges of the internal electrode are exposed may be provided with the first and second side margin parts. The thickness of the side margin parts may be easily controlled according to the amount of the ceramic slurry.

The internal electrode may be entirely formed on the dielectric layer in the width direction thereof, such that the overlap area between the internal electrodes may be easily formed and the step portion generated by the internal electrode may be decreased.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body having first and second side surfaces facing each other, and third and fourth end surfaces connecting the first and second side surfaces;
   a plurality of internal electrodes formed in the ceramic body and having one ends thereof exposed to the third end surface or the fourth end surface; and
   first and second side margin parts formed from the first and second side surfaces to edges of the internal electrodes,
   wherein in a width direction of the ceramic body, both edges of the internal electrodes include oxide regions, the oxidation regions of an internal electrode contributing to capacitance formation except for uppermost and lowermost internal electrodes among the internal electrodes have a maximum length Lmax of 3 μm or less, and a standard deviation in length is 1 μm or less.

2. The multilayer ceramic capacitor of claim 1, wherein the first and second side margin parts have an average thickness of 18 μm or less.

3. The multilayer ceramic capacitor of claim 1, wherein the first and second side margin parts are formed of ceramic slurry.

4. The multilayer ceramic capacitor of claim 1, wherein the internal electrodes include a first internal electrode having one end exposed to the third end surface and the other end formed so as to have a predetermined interval from the fourth end surface, and a second internal electrode having one end exposed to the fourth end surface and the other end formed so as to have a predetermined interval from the third end surface.

* * * * *